United States Patent [19]
Van Buul et al.

[11] 4,411,001
[45] Oct. 18, 1983

[54] DIFFERENTIAL PULSE CODE MODULATION TRANSMISSION SYSTEM

[75] Inventors: Marinus C. W. Van Buul, Breda; Theodoor M. M. Kremers, Eindhoven, both of Netherlands

[73] Assignee: U.S. Philips Corporation, New York, N.Y.

[21] Appl. No.: 305,815

[22] Filed: Sep. 24, 1981

[30] Foreign Application Priority Data

Oct. 30, 1980 [NL] Netherlands ............... 8005950

[51] Int. Cl.³ .......................................... H04B 12/04
[52] U.S. Cl. ..................................... 375/30; 358/135
[58] Field of Search ............ 332/11 D; 358/132, 135, 358/138; 375/27, 30, 31, 28

[56] References Cited

U.S. PATENT DOCUMENTS 4,099,122 7/1978 Buul ........................................ 375/30
4,292,651 9/1981 Kretz et al. ........................... 358/135

*Primary Examiner*—Benedict V. Safourek
*Attorney, Agent, or Firm*—Thomas A. Briody; William J. Streeter; Edward W. Goodman

[57] ABSTRACT

A hybrid D-PCM transmission system includes a transmitter in which an information signal $x(n)$ is converted into a DPCM signal $d(n)$ and an error reduction circuit in which this information signal $x(n)$, or an estimated version thereof, is quantized and encoded to provide an error reduction signal $y(n)$ which is added to the DPCM signal $d(n)$, resulting in a sum signal $s(n)$. In an associated receiver, a locally obtained error reduction signal $y'(n)$ is subtracted from this sum signal $s'(n)$ and the difference signal $d'(n)$ thus produced is converted into a local version $\hat{x}'(n)$ of the information signal. This last-mentioned information signal is quantized in a local error reduction circuit and encoded to produce the local error reduction signal $y'(n)$. In the transmitter, means are also provided for producing a quantization error signal component $\tilde{q}(n)$ which is added to the sum signal $s(n)$ for transmission. Equivalent means are provided in the receiver for producing a local quantization error signal component $\tilde{q}'(n)$ which is subtracted from the received signal $z'(n)$.

5 Claims, 17 Drawing Figures

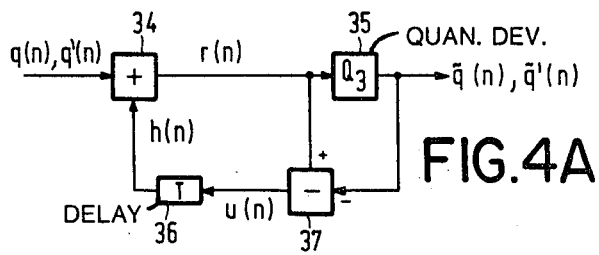
FIG.4A
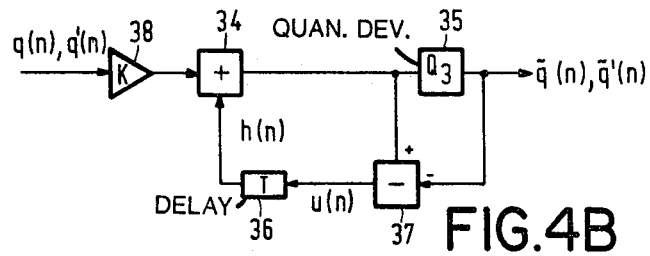
FIG.4B
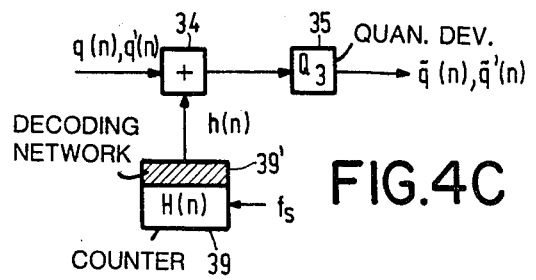
FIG.4C
| H(n) | h(n) |
|---|---|
| 0 0 0 | 0 0 0 |
| 0 0 1 | 1 0 0 |
| 0 1 0 | 0 1 0 |
| 0 1 1 | 1 1 0 |
| 1 0 0 | 0 0 1 |
| 1 0 1 | 1 0 1 |
| 1 1 0 | 0 1 1 |
| 1 1 1 | 1 1 1 |
FIG.4D
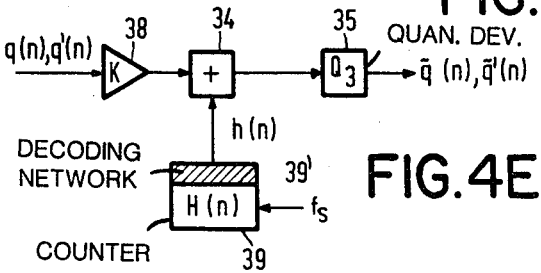
FIG.4E
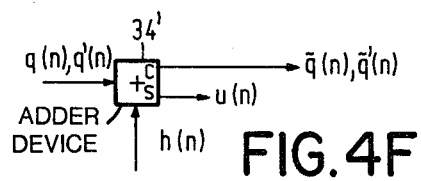
FIG.4F

DIFFERENTIAL PULSE CODE MODULATION TRANSMISSION SYSTEM

BACKGROUND OF THE INVENTION

1. Field of the Invention

The invention relates to a transmission system comprising a transmitter and a receiver for transmitting and receiving an information signal, a video signal in particular, in a digital format obtained by means of differential pulse code modulation (DPCM). The transmitter of this system includes a DPCM coding arrangement and the receiver includes a DPCM decoding arrangement.

2. Description of the Prior Art

In one type of DPCM coding arrangement, a prediction signal is continuously subtracted from the information signal to generate a difference signal which is first quantized and thereafter encoded. This prediction signal represents an estimated version of the information signal. It is derived from the quantized difference signal which, for that purpose, is applied to an integrating network. The encoding action results in that quantized difference signal, being converted into a DPCM signal consisting of a sequence of code words which occur at a predetermined rate $f_s$, alternatively denoted the sampling rate. The inverse quantity $1/f_s$ is sometimes denoted the sampling period and is represented by the symbol T.

The code words generated by the DPCM coding arrangement are transmitted to the DPCM decoding arrangement via a transmission medium. In the decoding arrangement the received codewords are decoded, as a result of which the quantized difference signal is obtained again. This difference signal is also now applied to an integrating network which produces an output signal in response thereto, the shape of which accurately corresponds with the shape of the original information signal. To accomplish this, this integrating network of the DPCM decoding arrangement is of the same construction as the integrating network of the DPCM coding arrangement and both integrating networks have the same time constant.

The integrating network of the DPCM decoding arrangement has the property that each received codeword contributes during a predetermined time interval to the formation of the output signal. As a consequence, should a codeword be disturbed on the transmission path, this disturbance negatively affects this output signal during that time interval. This time interval is usually many times longer than the sampling period T and is closely related to the time constant of the integrating network. If this time constant is infinitely large (in this connection the term "ideal integrator" is sometimes used), the output signal of this integrating network will never obtain the proper value again after the occurrence of a transmission error. In such a case, as applied to a TV video signal, it is customary to set the integrating networks of the coding and decoding arrangements to a fixed value at the end of each TV line.

When the time constant becomes smaller, (in this connection the term "leaky integrator" is sometimes used) the time interval also becomes smaller. A decrease of the time constant is accompanied, however, by a deterioration of the quality of the TV picture. The highest picture quality is obtained when ideal integrators are used. If leaky integrators are opted for, the leakage factor will always be a compromise between the length of the time interval (that is to say the speed at which a transmission error is eliminated) and the loss in picture quality.

In order that, in a DPCM transmission system in which ideal integrators are used, the influence of a disturbed code word is eliminated in a very short period of time, References 1, 2 and 3 propose to add in the transmitter an error reduction signal to the DPCM signal. This error reduction signal is then generated by an error reduction circuit which comprises a quantizing arrangement and a coding arrangement connected in cascade therewith. The information signal to be transmitted, or an estimated version thereof, is applied to this error reduction circuit.

In the receiver of this DPCM transmission system, an error reduction signal is subtracted from the received sum signal to generate the original DPCM signal. Also the error reduction signal generated in the receiver is generated by an error reduction circuit which is likewise formed by a quantizing arrangement coupled in cascade therewith. This error reduction circuit is supplied with a signal which is generated in the DPCM decoding arrangement and which, in the case of an undisturbed transmission, corresponds, to the best possible extent, to the error reduction signal generated in the transmitter.

SUMMARY OF THE INVENTION

The above-described prior art transmission system is sometimes referred to as a hybrid DPCM transmission system. As will be apparent from FIG. 13 of Reference 1, and as described in Reference 2, it is however, also in this transmission system, not possible to fully eliminate the influence of the transmission error in all circumstances, for example when the information signal is constant. In that case there remains a residual error the value of which is, at the most, equal to the quantizing step size, which is associated which the relevant information signal value, of the quantizing arrangement included in the error reduction circuit of the receiver.

The invention has for its object to reduce the residual error which occurs in the hybrid D-PCM transmission system.

According to the invention, there is provided a transmission system comprising:

A. a transmitter including:
  (1) a DPCM coding arrangement for converting an information signal into a DPCM signal and including a first difference producer to which the information signal is applied via a first input and an estimated version of this information signal via a second input for generating a first difference signal,
  (2) a first error reduction circuit for generating a first error reduction signal which reduces transmission errors and includes a first quantizing device, the input of which is coupled to one of the two inputs of the first difference producer;
  (3) means coupled to the first quantizing device for producing a first quantization error signal;
  (4) means for modifying the first quantization error signal for generating a modified first quantization error signal;
  (5) adder means for generating the transmitter output signal;
  (6) means for applying the DPCM signal, the first error reduction signal and the modified first quantization error signal to the adder means;

B. a receiver including:

(1) a receiver input for receiving the transmitter output signal;
(2) a second difference producer, a first input of which is coupled to the receiver input and to which a second error reduction signal is applied via a second input, for generating a second difference signal;
(3) a DPCM decoding arrangement to which the second difference signal is applied and which has a DPCM decoding arrangement output;
(4) a second error reduction circuit for generating the second error reduction signal and including a second quantizing device, the input of which is coupled to the DPCM decoding arrangement output;
(5) means coupled to the second quantizing device for generating a second quantization error signal;
(6) means for modifying the second quantization error signal for generating a modified second quantization error signal;
(7) means which are coupled, in cascade with the second difference producer, between the receiver input and the DPCM decoding arrangement output and to which the modified second quantization error signal is applied for eliminating the modified first quantization error signal present in the received tranmitter output signal.

References

1. Hybrid D-PCM for Joint Source/Channel Encoding; Th. M. M. Kremers, M. C. W. van Buul; Tijdschrift voor het Nederlands Elecktronica-en Radiogenootschap deel 44, no. 5/6 1979, pages 257-261.
2. Transmission System by Means of Time Quantization and Trivalent Amplitude Quantization; U.S. Pat. No. 4,099,122 dated July 4, 1978.
3. Hybrid D-PCM, A Combination of PCM and DPCM; M. C. W. van Buul; IEEE Transactions on Communications, Vol. COM-26, No. 3, March 1978, pages 362-368.
4. A Simple High Quality DPCM-codec for Video Telephony Using 8 Mbit per second; G. Bostelmann; Nachrichtentechnische Zeitschrift Bd 27, March, 1974, H.3, pages 115-117.
5. Arithmetic Operations in Digital Computers, R. K. Richards; D. van Nostrand Company, INC 1957.
6. Digital Signal Processing; A. V. Oppenheim, R. W. Schafer; Prentice-Hall, INC, 1975.

SHORT DESCRIPTION OF THE FIGURES

In order that the invention may be more fully understood reference will now be made by way of example to the accompanying drawings, of which:

FIGS. 1A and 1B show the hybrid D-PCM transmission system as it is described in Reference 2;

FIG. 2a and FIG. 2b each show a diagram to illustrate the operation of the prior art hybrid D-PCM transmission system;

FIGS. 4A-4F show some embodiments of the modifying circuit used in the transmission system shown in FIG. 3;

Figure 3A:
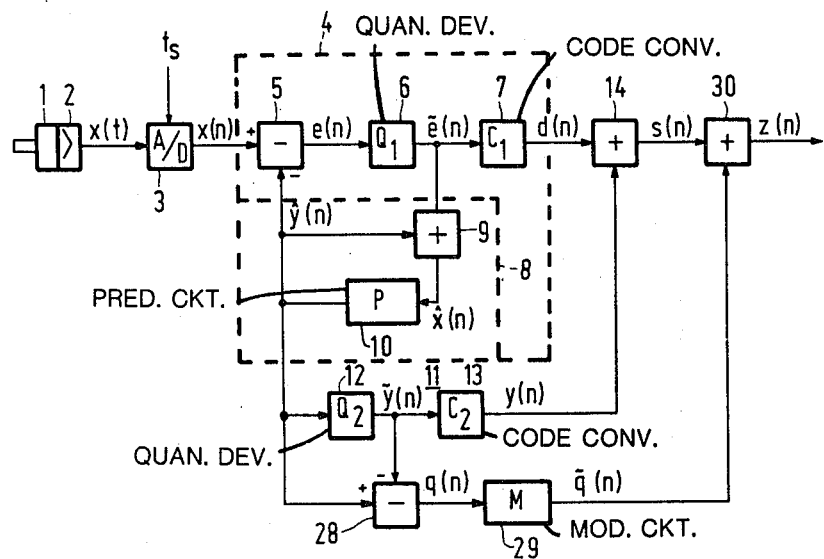
FIGS. 3A and 3B show the hybrid D-PCM transmission system comprising the measures of the invention.
Figure 3B:
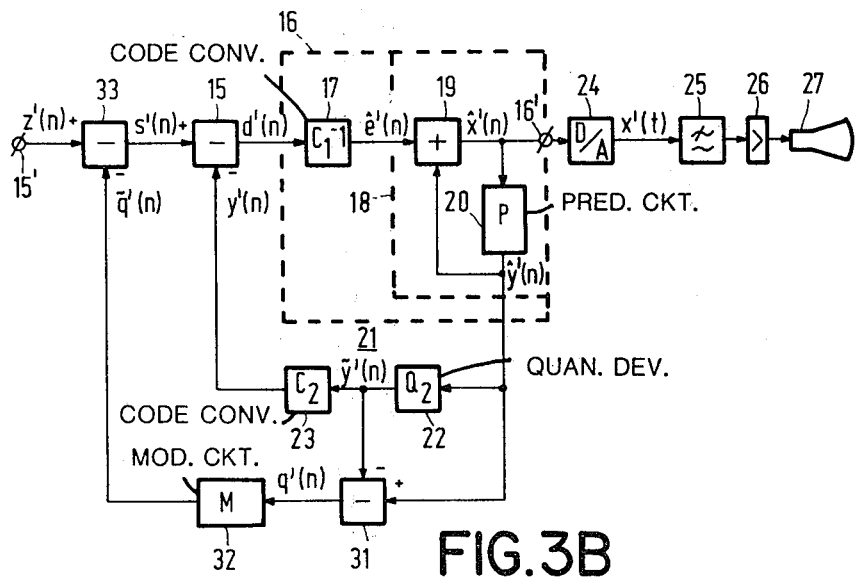
Figure 5A:
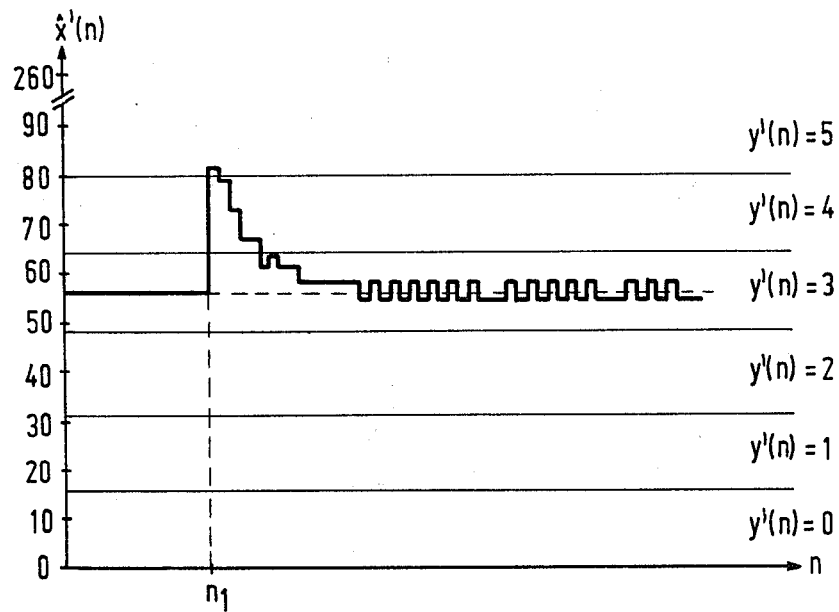
Figure 5B:
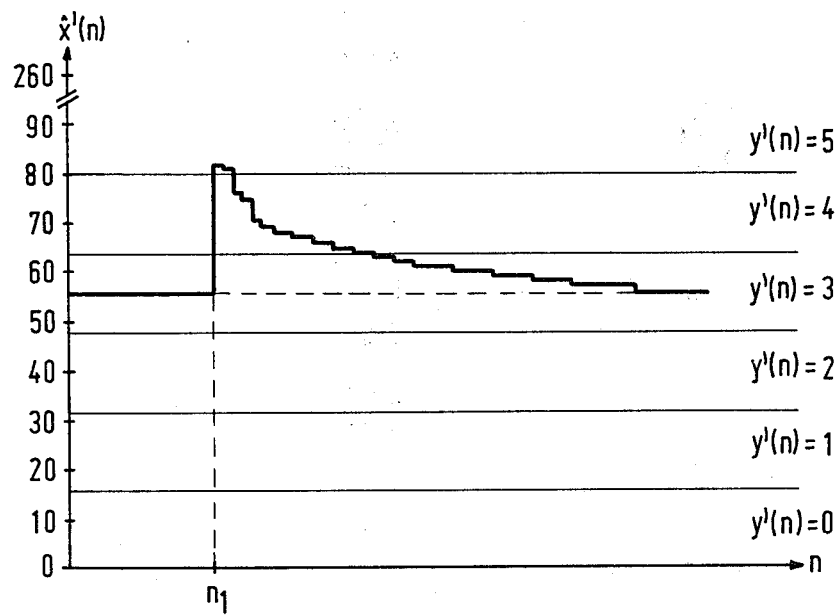
Figure 6A:
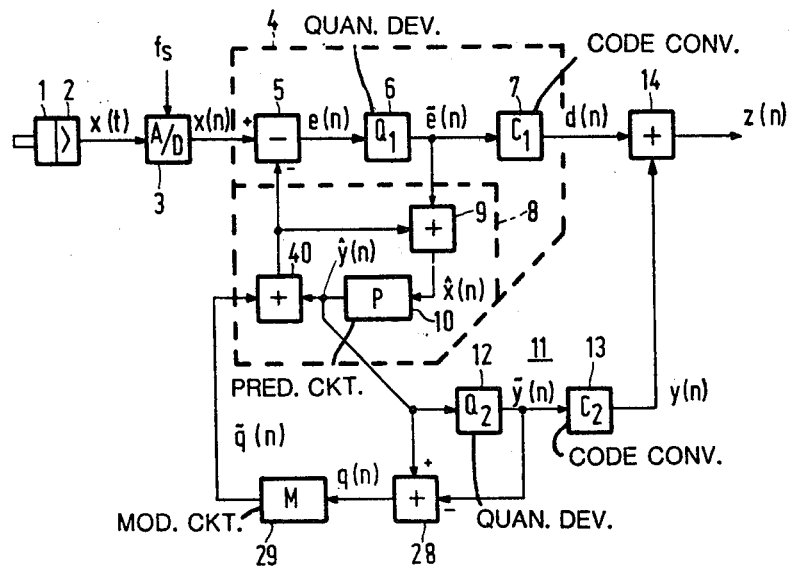
Figure 6B:
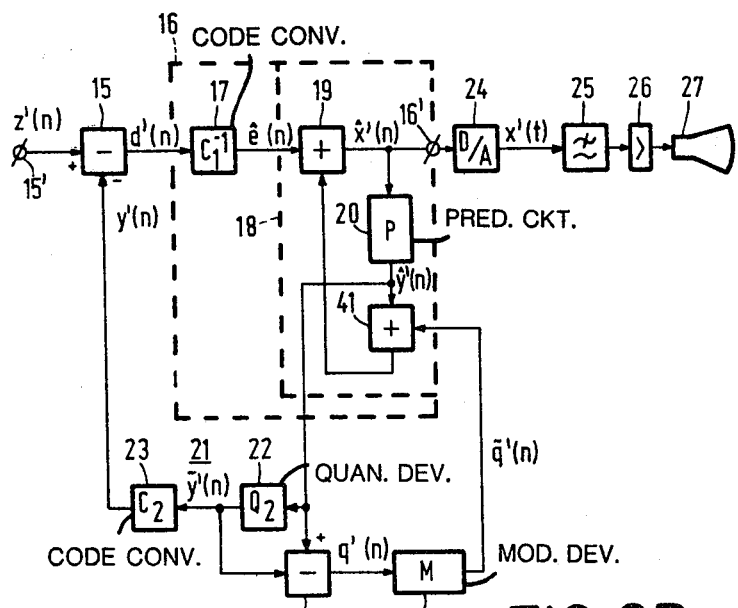
Figure 7:
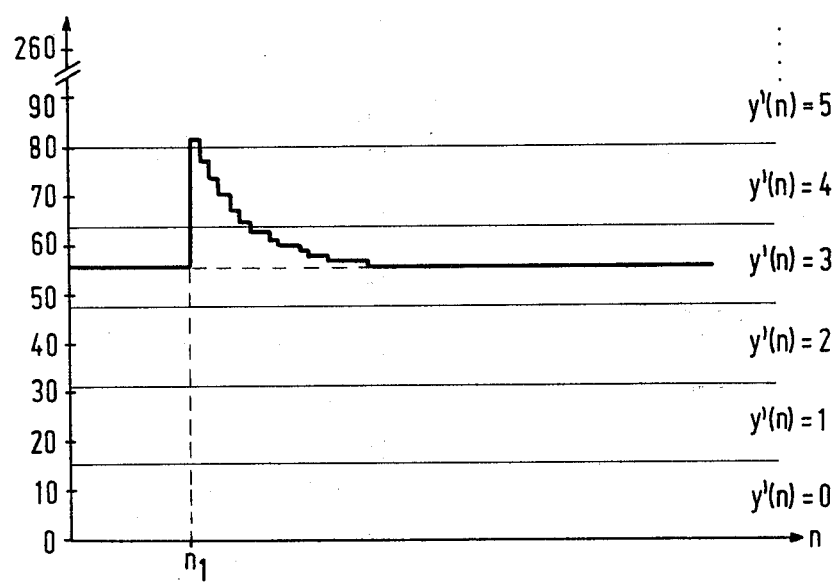

FIG. 5a and FIG. 5b each show a diagram to illustrate the operation of the transmission system shown in FIG. 3;

FIGS. 6A and 6B show the hybrid D-PCM transmission system in which the invention has been implemented in a different manner; and FIG. 7 shows a diagram to illustrate the operation of the transmission system shown in FIG. 6.

DESCRIPTION OF THE EMBODIMENT (1) The Prior Art Hybrid D-PCM Transmission System Although, as is known, DPCM-coding and-decoding arrangements may be implemented in different ways the following description will be limited to the digital implementation.

Figure 1A:
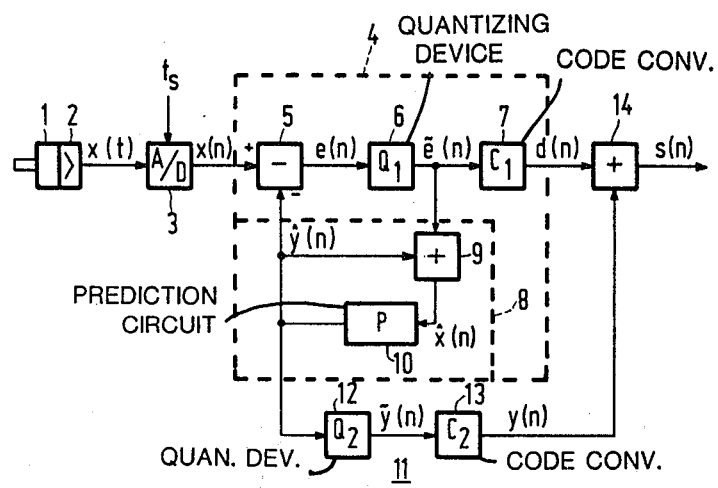
Figure 1B:
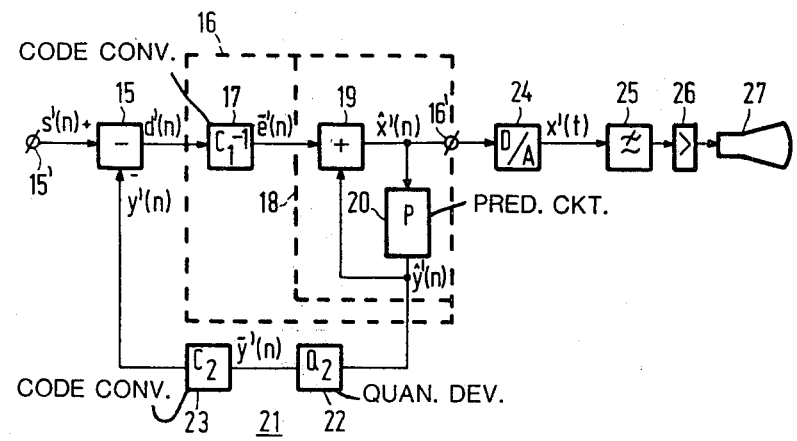

In FIG. 1, A shows an embodiment of a transmitter of the known hybrid D-PCM transmission system described in the References 1, 2 and 3. This transmitter includes a TV camera 1 with built-in video amplifier 2, which produces an analog video signal x(t). This video signal is applied to an analog-to-digital converter 3, which produces the digital video signal x(n). This analog-to-digital converter 3 is controlled by sampling pulses which occur with a period T. Thereafter the digital video signal x(n) is applied to a DPCM coding arrangement 4, which produces the DPCM signal d(n). For that purpose this DPCM coding arrangement includes a difference producer 5, to which the signal x(n) and a prediction signal $\hat{y}(n)$ are applied, to generate a difference signal $e(n) = x(n) - \hat{y}(n)$. This difference signal is applied to a quantizing arrangement 6, which has, as is customary, a non-linear quantizing characteristic and which converts this difference signal into a quantized difference signal $\tilde{e}(n)$. For the generation of the DPCM signal, this quantized difference signal $\tilde{e}(n)$ is applied to a code converter 7. This quantized difference signal is also applied to an integrating network 8 for the generation of the prediction signal $\hat{y}(n)$, it being assumed that this integrating network 8 is an ideal integrator. To this end, this integrating network 8 comprises an adder device 9 to which both the quantized difference signal $\tilde{e}(n)$ and the prediction signal $\hat{y}(n)$ are applied. The resulting sum signal $\hat{x}(n)$ which is an approximation of x(n), is applied to what is commonly called a prediction circuit 10, which produces the prediction signal $\hat{y}(n)$. The simplest form of this prediction circuit 10 is a delay device having a time delay of one sampling period T.

In order to realize the hybrid D-PCM transmission system, the prediction signal $\hat{y}(n)$ is now not only applied in the embodiment shown to the difference producer 5, but also to an error reduction circuit 11. The latter includes a quantizing device 12 producing a quantized prediction signal $\tilde{y}(n)$, which is applied to a code converter 13 producing an error reduction signal y(n). This error reduction signal is added to the DPCM signal d(n) is an adder device 14 and the sum signal s(n) thus obtained is transmitted to the receiver shown at B.

This receiver has a receiver input 15' at which the received version s'(n) of the sum signal s(n) occurs, which is applied, together with an error reduction signal y'(n), to a difference producer 15 for the generation of a difference signal $d'(n) = s'(n) - y'(n)$ which, for an undisturbed transmission, corresponds to the DPCM signal d(n). This difference signal is applied to a DPCM decoding arrangement 16 for the generation of the decoding arrangement output signal $\hat{x}'(n)$, which corresponds to the signal $\hat{x}(n)$ and occurs at the DPCM decoding arrangement output 16'. To this end, this DPCM decoding arrangement 16 comprises a code converter 17 whose operation is the reverse of the operation of the code converter 7 and which produces a signal $\hat{e}'(n)$, which corresponds to the quantized difference signal ē(n). This signal ẽ'(n) is applied to an integrating network 18, which is also implemented as an ideal integrator and is of a similar construction as the integrating network 8 in the transmitter. Thus, also this integrating network 18 comprises an adder device 19 to which the signal ẽ'(n) and an auxiliary prediction signal ŷ'(n) are applied for the generation of the decoding arrangement output signal x̂'(n). In order to generate the auxiliary prediction signal ŷ'(n), the signal x̂'(n) is applied to an auxiliary prediction circuit 20, which is of a similar construction as the prediction circuit 10 in the transmitter.

For the generation of the error reduction signal y'(n), the signal ŷ'(n) is also applied to an error reduction circuit 21, which also comprises a quantizing device 22, which produces the quantized auxiliary prediction signal ȳ'(n), which corresponds to the quantized prediction signal ȳ(n) in the transmitter. This signal ȳ'(n) is further applied to a code converter 23, which produces the error reduction signal y'(n). The quantizing devices 12 and 22 have the same quantizing characteristic and the code converters 13 and 23 have the same transfer characteristic.

Signal x̂'(n) is not only applied to the auxiliary prediction circuit 20 but also to a digital-to-analog converter 24 producing the analog output signal x'(t), which corresponds to the analog video signal x(t) in the transmitter and which is applied to a display tube 27 via a low-pass filter 25 and a video amplifier 26.

Experience has shown that the operation of this known hybrid D-PCM transmission system can be illustrated best by means of a diagram of the response of this transmission system to a constant video signal. Before doing so, let it be assumed in the transmission system of FIG. 1 that:

1. x(n) represents a unipolar video signal;
2. the analog-to-digital converter 3 is uniform and that a quantizing step size $Q_o$ is used therein;
3. s(n), e(n), ē(n), x̂(n), ŷ(n), ȳ(n), ẽ'(n), x̂'(n), ŷ'(n), ȳ'(n) each comprise eight magnitude bits so that $0 \leq x(n)$, ŷ(n), x̂(n), ȳ(n), ŷ(n), x̂'(n), ȳ'(n) $\leq 2^8 - 1 - 2^8 + 1 \leq e(n)$, ē(n), ẽ'(n) $\leq 2^8 - 2$;
4. the quantizing device 6 has the quantizing characteristic shown in the References 3 and 4 (what is known as Bostenmann quantizing characteristic), the smallest quantizing step size likewise being equal to $Q_o$;
5. the quantizing devices 12 and 22 are each uniform and have a quantizing step size $Q_2$ which is sixteen times as large as $q_o$, and that d(n), d'(n), y(n) and y'(n) can each be represented by four magnitude bits so that: $0 \leq y(n)$, y'(n) $\leq 2^4 - 1$ and $-2^4 + 1 \leq d(n)$, d'(n) $\leq 2^4 - 1$;
6. each prediction circuit 10 and 20 is formed by a delay device having a time delay of one sampling period T.

In order to get a proper insight into the behavior of this transmission system, let it be assumed that in the transmitter y(n) is not added to d(n) and that in the receiver in a corresponding manner y'(n) is not subtracted from the received DPCM signal. In this case we have a conventional DPCM transmission system and it holds then that s(n)=d(n). Let it now be assumed that x(n)=56 for all values of n. Then it holds that also ŷ(n)=56 for all values of n, so that e(n)=ē(n)=d(n)=s(n)=0.

Figure 2A:
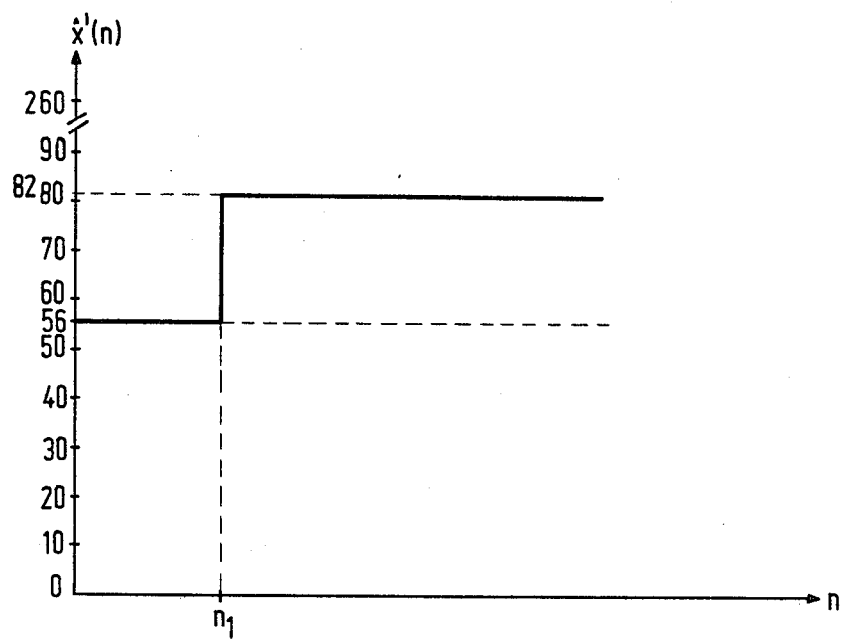

If now no transmission error is introduced on the transmission path then it holds that s'(n)=s(n)=0 and x̂'(n) will be equal to 56. If, however, for n=n₁, due to a transmission error, it suddenly holds that s'(n)=4 then from that moment onwards also x̂'(n) is no longer equal to 56 but equal to, for example, 82. All this is shown in the diagram of FIG. 2a. From this diagram it will be apparent that in a conventional DPCM transmission system in which ideal integrators are used, the effect of a transmission error on the decoding arrangement output signal x̂'(n) is not eliminated.

Figure 2B:
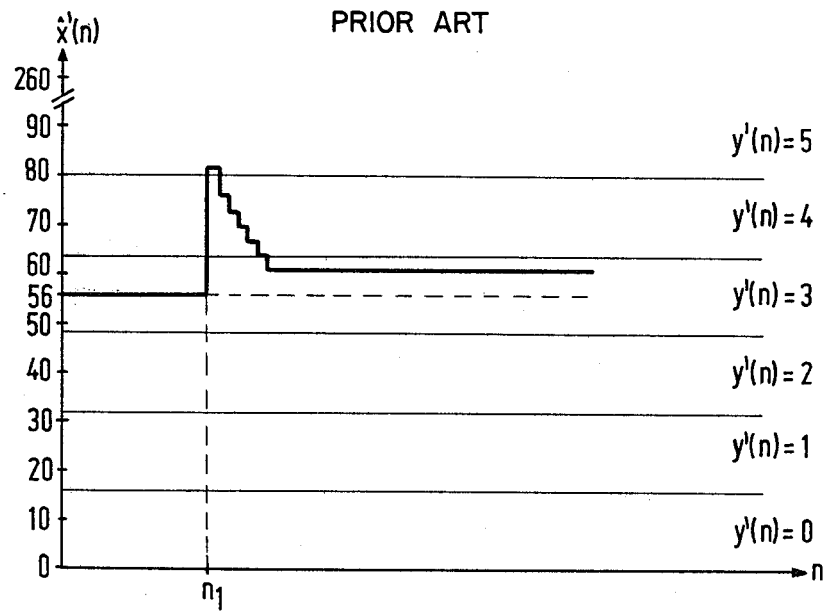

If now, as has been proposed, the error reduction signal y(n) is added in the hybrid D-PCM transmission system to the DPCM signal d(n), then a transmitter output signal s(n) is obtained which, in spite of the fact that d(n)=0, has a value which differs from zero. More particularly, in the case considered here y(n)=3 and consequently also s(n)=3 for all values of n. If now the same error is introduced on the transmission path as illustrated in the diagram of FIG. 2a, then s'(n₁) becomes equal to 7. As now in the receiver the signal y'(n) is subtracted from s'(n) the decoding arrangement 16 produces in response to this signal s'(n) the signao x̂'(n) which varies as shown in the diagram of FIG. 2b. From this diagram it can be seen that the effect of a transmission error is now greatly reduced. More particularly, the effect of this transmission error is now eliminated so far until x̂'(n) has a value which is located in that quantizing interval of the quantizing device 22 in which also x̂(n) is located. In other words: the value of y'(n) associated with x̂'(n) must be equal to the value of y(n) associated with x(n). In the example considered here, wherein y(n)=3, the effect of the transmission error will be eliminated so far until also y'(n)=3. A further reduction of the effect of the transmission error is now not possible, so that a residual error may be present which is equal to not more than one quantizing step $Q_2$.

It should be noted that the horizontal lines in FIG. 2b denote the limits of the consecutive quantizing intervals of the quantizing device 22. For the same of completeness, it should be noted that a quantizing interval of a quantizing device is understood to means the sequence of input signal values which all produce the same output signal value. In the embodiment described, this means, for the quantizing devices 12 and 22, that the $0^{th}$ quantizing interval comprises the signal values $0 \leq x̂(n)$, x̂'(n) $\leq 16$. If x̂(n) and x̂'(n), respectively, are located in this $0^{th}$ quantizing interval, then it holds that y(n)=0 and y'(n)=0, respectively. The first quantizing interval comprises the signal values $16 \leq x̂(n)$, x̂'(n) $\leq 32$. For this quantizing interval it holds that y(n)=1 and y'(n)=1 etc. respectively.

2. Improvements to the Hybrid D-PCM Transmission System

The residual error mentioned in the preceding paragraph which remains in the known hybrid D-PCM transmission system can now be reduced by introducing the improvement, shown in FIG. 3, into this known hybrid D-PCM transmission system. In the transmitter shown at A in FIG. 3, this improvement consists in that the input and output signals ŷ(n) and ȳ(n), respectively, of the quantizing device 12 are applied to a difference producer 28 for the generation of a quantization error signal q(n)=ŷ(n)−ȳ(n). This error signal is applied to a modifying circuit 29, the construction of which will be described hereafter and which produces a modified quantization error signal q̄(n). This signal q(n) is added in an adder device 30 to the sum signal s(n), whereby the transmitter output signal $z(n)=s(n)+\tilde{q}(n)$ is obtained.

In the receiver shown at B in FIG. 3, the improvement consists in a corresponding manner in that the input and output signal $\hat{y}'(n)$ and $\tilde{y}'(n)$, respectively, of the quantizing device 22 are applied to a difference producer 31 for the generation of a quantization error signal $q'(n)=\hat{y}'(n)-\tilde{y}'(n)$. This signal is applied to a modifying circuit 32, which produces a modified quantization error signal $\tilde{q}'(n)$ and is of the same construction as the modifying circuit 29 in the transmitter. In a difference producer 33, the signal $\tilde{q}'(n)$ is subtracted from the received transmitter output signal $z'(n)$ for the generation of the sum signal $s'(n)$.

A first embodiment of the modifying circuit is shown at A in FIG. 4 and comprises an adder device 34 to which one of the quantization error signals, $q(n)$ or $q'(n)$, as well as an auxiliary signal $h(n)$ are applied. This adder device 34 produces a sum signal $r(n)$ which is applied to a quantizing device 35, which produces the modified quantization error signal $\tilde{q}(n)$ or $\tilde{q}'(n)$.

The auxiliary signal $h(n)$ is taken from the output of a delay device 36, the input of which is connected to the output of a difference producer 37 to which both the sum signal, $r(n)$ and the output signal $\tilde{q}(n)$, or $\tilde{q}'(n)$ of the quantizing device 35 are applied to produce a difference signal $u(n)$. The time delay of the delay device 36 is equal to one sampling period T. Thus, this auxiliary signal represents a delayed version of the quantizing error signal $q(n)$ introduced by the quantizing device 35.

In known manner the quantizing device 35 may be implemented in such manner that a quantizing characteristic is obtained which is identical to a round-off characteristic (see, for example, FIG. 9.1 of Reference 6). It may alternatively be implemented in such manner that it only passes the most significant bits of $r(n)$. This means that the quantizing characteristic is identical to a truncation characteristic (see also FIG. 9.1 of Reference 6).

A second embodiment of each modifying circuit is shown at B in FIG. 4. This embodiment differs from the embodiment shown at A in that the quantization error signal, $q(n)$ or $q'(n)$, is now applied to the adder device 34 via a multiplier 38. This multiplier 38 has a multiplying factor K whose absolute value is less than unity.

A third embodiment of each modifying circuit is shown at C. This embodiment differs from the embodiment shown at A in that the auxiliary signal $h(n)$ is derived from the counting positions $H(n)$ of a counter 39 to which the sampling pulses are applied as counting pulses. A decoding network 39', which produces the auxiliary signal $h(n)$, is connected to this counter 39. More particularly, $h(n)$ represents the bit-inverse version of the counting position $H(n)$. For the sake of completeness, this relationship between $H(n)$ and $h(n)$ is shown at D, it being assumed that $H(n)$ has only three bits.

A fourth embodiment of each modifying circuit is shown at E. This embodiment differs from the embodiment shown at C in that the quantization error signal, $q(n)$ or $q'(n)$, is now applied to the adder device 34 via the multiplier 38. Also now, this multiplier 38 has a multiplying factor K whose absolute value is less than unity.

It should be noted that the counter 39 in the modifying circuit of the receiver must be in synchronism with the modifying circuit in the transmitter. This can be realized in usual manner.

If now, more particularly, it is expected of the quantizing device 35 of the modifying circuits that it only allows the most significant bit or $r(n)$ to pass, then the functions of the adder device 34, the quantizing device 35 and the difference producer 37 can be realized in the manner shown at F in FIG. 4 by means of an adder device 34' which has a sum output S and a carry output C. An embodiment of such an adder device is shown in, for example, FIG. 4-1 of Reference 5. The carry pulses occurring at the carry output C represent each time the most significant bit of the above-mentioned sum signal $r(n)$ and this bit is assumed to be the least significant bit of $q(n)$ or $q'(n)$. The signal $u(n)$ occurring at the sum output S then represents the equivalent of the quantizing error signal produced by the difference producer 37.

If now in the transmission system of FIG. 3 the modifying circuits 29 and 32 are each constructed in the manner as shown at A in FIG. 4, the quantizing device 35 then only allowing the most significant bit of $r(n)$ to pass, and it being assumed that for all values of n the signal $s'(n)$ is equal to 3, $n=n_1$ excepted for which $s'(n_1)$ is assumed to be equal to 7, then the output signal $\hat{x}'(n)$ of the decoding arrangement 16 varies as shown in FIG. 5a. From this it is seen that an oscillation phenomenon occurs a soon as a transmission error has occurred. This oscillation phenomenon is caused by the fact that, as a result of the transmission error produced, the signal $h'(n)$ in the receiver shows a phase shift with respect to the signal $h(n)$ in the transmitter. Therefore, this oscillation phenomenon has been found to disappear when each modifying circuit 29 and 32 is constructed in the manner shown at C in FIG. 4, the cascade arrangement of adder device 34 and quantizing device 35 being constructed in the manner shown in F in FIG. 4. In that case $\hat{x}'(n)$ has the variation shown in FIG. 5b.

3. An Alternative Embodiment

In the transmission system shown in FIG. 3 the modified quantizing error signal $\tilde{q}(n)$ is directly added in the transmitter to the sum signal $s(n)$ in order to obtain the transmitter output signal $z(n)$. FIG. 6 shows an alternative embodiment of this transmission system. It differs from the transmission system shown in FIG. 3 in that in the transmitter shown at A in FIG. 6, the modified quantization error signal $\tilde{q}(n)$ is added to the prediction signal $\hat{y}(n)$ by means of an adder device 40. In a corresponding manner the modified quantization error signal $\tilde{q}'(n)$ is added in the associated receiver shown at B in an adder device 41 to the auxiliary prediction signal $\hat{y}'(n)$.

In this embodiment each of the modifying circuits 29 and 32 is preferably implemented in the manner shown at B in FIG. 4, the quantizing device 35 then having a round-off characteristic. In that case $\hat{x}'(n)$ varies in the manner shown in FIG. 7. It is then assumed that $K = -0.2$ and that, as in the foregoing, $x(n)$ is constant and equal to 56.

4. General Remarks

A. For the sake of brevity, reference is made to Reference 2 for the different embodiments of the hybrid D-PCM transmission system. The following should, however, be noted:

1. In the transmission system shown in FIGS. 1 and 3 the prediction signal $\hat{y}(n)$ is each time applied in the transmitter to the error reduction circuit 11. It is, however, alternatively possible to apply, instead of signal $\hat{y}(n)$, the digital video signal $x(n)$ or the version of signal $x(n)$ which has been delayed for one sampling period T to this error reduction circuit. In the latter case the prediction circuit 10 may be used for carrying out a multi-dimensional prediction.

2. In the embodiments shown, the quantized difference signal $\tilde{e}(n)$ is each time directly applied to the integrating network 8 of the transmitter. It is, however, alternatively possible to apply instead of the DPCM signal $d(n)$ to this integrating network via a code converter. This code converter must then have the same transmission function as the code converter 17 in the receiver.

3. In the embodiments shown, the analog video signal $x(t)$ is converted into a digital video signal $x(n)$ before it is applied to the DPCM coding arrangement 4. It is, however, alternatively possible to apply instead of $x(n)$, the analog video signal $x(t)$ directly to the DPCM coding arrangement. In that case the quantizing arrangement 6 must then, however, be replaced by an analog-to-digital converter and the digital prediction signal $\hat{y}(n)$ must be converted in a digital-to-analog converter into an analog prediction signal.

B. As regards the improved hybrid D-PCM transmission system it should be noted that the following modifications are still possible therein.

1. Without any detrimental effect on the proper functioning of the transmission system, it is possible to apply, in the system shown in FIG. 6, the output signal of the quantizing devices 12 or 22 to the adder devices 40 or 41 instead of the output signal of the predictin circuit 10 or 20.

2. Reference 2 describes that the function of the cascade arrangement of quantizing devices 12 or 22 and code converters 13 or 23 may be realized by means of a magnitude truncator. In the transmission system embodiment described here, a magnitude truncator will then preferably be taken which has two outputs and which receives at a first output each time the four most significant bits of the code word produced by the prediction circuit 10 or 20, while the four least significant bits of that code word are each time applied to the second output. The four-bit code words occurring at the first output of the magnitude truncator represent the error reduction signals $y(n)$ and $y'(n)$ respectively. The four-bit code words occurring at the second output of this magnitude truncator represent the quantizing error signals $q(n)$ and $q'(n)$, respectively.

What is claimed is:
1. A transmission system comprising:
A. a transmitter including:
  (1) a DPCM coding arrangement for converting an information signal $x(n)$ into a DPCM signal $d(n)$ and including a first difference producer, to a first input of which the information signal $x(n)$ is applied and to a second input of which an estimated version $y(n)$ of this information signal is applied, for generating a first difference signal $e(n)$,
  (2) a first error reduction circuit for generating a first error reduction signal $y(n)$ which reduces transmission errors and includes a first quantizing device having an input for receiving one of the signals applied to the two inputs of the first difference producer;
  (3) means coupled to the first quantizing device for producing a first quantization error signal $q(n)$;
  (4) means for modifying the first quantization error signal $q(n)$ for generating a modified first quantization error signal $\bar{q}(n)$;
  (5) adder means for generating the transmitter output signal $z(n)$;
  (6) means for applying the DPCM signal $d(n)$, the first error reduction signal $y(n)$ and the modified first quantization error signal $\bar{q}(n)$ to the adder means;
B. a receiver including:
  (1) a receiver input for receiving the transmitter output signal $z'(n)$;
  (2) a second difference producer, a first input of which is coupled to the receiver input and to which a second error reduction signal $y'(n)$ is applied via a second input, for generating a second difference signal $d'(n)$;
  (3) a DPCM decoding arrangement to which the second difference signal $d'(n)$ is applied and which has a DPCM decoding arrangement output;
  (4) a second error reduction circuit for generating the second error reduction $y'(n)$ signal and including a second quantizing device, the input of which is coupled to the DPCM decoding arrangement output;
  (5) means coupled to the second quantizing device for generating a second quantization error signal $q'(n)$;
  (6) means for modifying the second quantization error signal $q'(n)$ for generating a modified second quantization error signal $\bar{q}'(n)$; and
  (7) means which are coupled, in cascade with the second difference producer, between the receiver input and the DPCM decoding arrangement output and to which the modified second quantization error signal $\bar{q}'(n)$ is applied for eliminating the modified first quantization error signal $\bar{q}(n)$ present in the received transmitter output signal $z'(n)$.

2. A transmission system as claimed in claim 1, in which both said means for modifying the quantization error signals $q(n)$ and $q'(n)$ comprise:
  (1) an adder device having a first and a second output as well as a sum output;
  (2) means for applyng the quantization error signal $q(n)$ to the first input;
  (3) means for generating an auxiliary signal $h(n)$ which is applied to the second input; and
  (4) quantizing means, the input of which is connected to the sum output.

3. A transmission system as claimd in claim 2, in which the means for applying the quantization error signal $q(n)$ to the first input of the adder device comprises a multiplying device having a multiplying factor the absolute value of which is less than unity.

4. A transmission system as claimed in claim 2, in which said means for generating the auxiliary signal $h(n)$ comprises:
  (1) means, coupled to the quantizing means, for generating a third quantization error signal $u(n)$; and
  (2) delay means to which this third quantization error signal $u(n)$ is applied.

5. A transmission system as claimed in claim 2, in which said means for generating an auxiliary signal $h(n)$ comprises:
  (1) a counting circuit to which periodically occurring counting pulses are applied; and
  (2) a decoding network for converting the consecutive counting positions into the auxiliary signal $h(n)$.

* * * * *